United States Patent [19]

Louwagie et al.

[11] Patent Number: 5,606,513
[45] Date of Patent: Feb. 25, 1997

[54] TRANSMITTER HAVING INPUT FOR RECEIVING A PROCESS VARIABLE FROM A REMOTE SENSOR

[75] Inventors: Bennett L. Louwagie, Plymouth; Gregory S. Munson, Apple Valley; David E. Wiklund, Eden Prairie; Michael J. Zweber, New Prague; David A. Broden, Chanhassen; Brian J. Bischoff, Chaska, all of Minn.; Gary P. Corpron, Nunn, Colo.

[73] Assignee: Rosemount Inc., Eden Prairie, Minn.

[21] Appl. No.: 258,262

[22] Filed: Jun. 9, 1994

Related U.S. Application Data

[63] Continuation-in-part of Ser. No. 124,246, Sep. 20, 1993, abandoned.

[51] Int. Cl.⁶ ........................................... G01C 25/00
[52] U.S. Cl. ........................................ 364/510; 364/506
[58] Field of Search .............................. 364/492, 478, 364/510, 506–558

[56] References Cited

U.S. PATENT DOCUMENTS

| | | | |
|---|---|---|---|
| 3,701,280 | 10/1972 | Stroman | 73/194 M |
| 4,238,825 | 12/1980 | Geery | 364/510 |
| 4,414,634 | 11/1983 | Louis et al. | 364/510 |
| 4,419,898 | 12/1983 | Zanker et al. | 73/861.02 |
| 4,446,730 | 5/1984 | Smith | 73/301 |
| 4,485,673 | 12/1984 | Stern | 73/304 C |
| 4,528,855 | 7/1985 | Singh | 73/721 |
| 4,562,744 | 1/1986 | Hall et al. | 73/861.02 |
| 4,598,381 | 7/1986 | Cucci | 364/558 |
| 4,602,344 | 7/1986 | Ferretti et al. | 364/509 |
| 4,677,841 | 7/1987 | Kennedy | 73/30 |
| 4,825,704 | 5/1989 | Aoshima et al. | 73/861.42 |
| 4,881,412 | 11/1989 | Northedge | 73/861.04 |
| 4,958,938 | 9/1990 | Schwartz et al. | 374/208 |
| 5,035,140 | 7/1991 | Daniels et al. | 73/290 V |
| 5,058,437 | 10/1991 | Chaumont et al. | 73/861.21 |

FOREIGN PATENT DOCUMENTS

| | | | |
|---|---|---|---|
| 0063685 | 3/1982 | European Pat. Off. | G01F 23/14 |
| 0223300 | 5/1985 | European Pat. Off. | G01F 1/36 |
| 0214801 | 3/1987 | European Pat. Off. | G01F 23/14 |
| 9109176 | 9/1991 | Germany . | |
| WO88/01417 | 2/1988 | WIPO | G08C 19/10 |
| WO89/02578 | 3/1989 | WIPO | G01D 21/00 |
| WO89/04089 | 5/1989 | WIPO | H03M 1/00 |
| WO90/15975 | 12/1990 | WIPO | G01L 7/08 |
| WO91/18266 | 11/1991 | WIPO | G01F 23/14 |

OTHER PUBLICATIONS

Brochure: "Reduce Unaccounted–For Natural Gas with High–Accuracy Pressure Transmitters," Rosemount Inc. Measurement Division, Eden Prairie, Minnesota, ADS 3073, May 1991, pp. 1–4.

Technical Information Bulletin, "Liquid Level Transmitter Model DB40RL Sanitary Sensor deltapilot," Endress+Hauser, Greenwood, Indiana, Sep. 1992, pp. 1–8.

"The Digitisation of Field Instruments,"Van Der Bijl, Journal A, vol. 32, No. 3, pp. 62–65, 1991.

"Single Chip Senses Pressure and Temperature," Machine Design, 64 (1992) May 21, No. 10.

Specification Summary, "Teletrans™ 3508–30A Smart Differential Pressure Transmitter," (undated) Bristol Babcock, Inc., Watertown, CT, 06795.

Specification Summary, "Teletrans™ 3508–10A Smart Differential Pressure Transmitter," (undated) Bristol Babcock, Inc., Watertown, CT, 06795.

(List continued on next page.)

Primary Examiner—Emanuel T. Voeltz
Assistant Examiner—Craig Steven Miller
Attorney, Agent, or Firm—Westman, Champlin & Kelly, P.A.

[57] ABSTRACT

A two-wire transmitter senses a pressure using an internal pressure sensor. The transmitter includes an input for receiving a process variable from a remote sensor which is separated from the transmitter. Circuitry in the transmitters transmits information on a two-wire process control loop which is related to the sensed pressure and the process variable.

29 Claims, 10 Drawing Sheets

OTHER PUBLICATIONS

Specification Summary, "AccuRate Advanced Gas Flow Computer, Model GFC 3308," (undated) Bristol Babcock, Inc., Watertown, CT, 06795.

Product Data Sheet 4640, "Model 3201 Hydrostatic Interface Unit," Mar. 1992, Rosemount Inc.,Eden Prairie, MN 55344.

Product Data Sheet 4638, "Model 3001CL Flush–Mount Hydrostatic Pressure Transmitter," Jul. 1992, Rosemount Inc., Eden Prairie, MN 55344.

"Flow Measurement," *Handbook of Fluid Dynamics,* V. Streeter, Editor–in–chief, published by McGraw–Hill Book Company, Inc. 1961, pp. 14–1 to 14–15.

"Precise Computerized In–Line Compressibel Flow Metering," *Flow —Its Measurement and Control in Science and Industry,* vol. 1, Part 2, Edited by R. Wendt, Jr., Published by American Institute of Physics e al., (undated) pp. 539–540.

"Mass–Flow Meter," Dr. C. Ikoku, *Natural Gas Engineering,* PennWell Books, (undated) pp. 256–257.

"Methods for Volume Measurement Using Tank–Gauging Devices Can Be Error Prone," F. Berto, *The Advantages of Hydrostatic Tank Gauging Systems,* undated reprint from *Oil & Gas Journal.*

"Hydrostatic Tank Gauging —Technology Whose Time Has Come,"J. Berto, *Rosemount Measurement Division Product Feature,* undated reprint from *Intech.*

"Pressure Sensors Gauge Tank Level and Fluid Density," *Rosemount Measurement Division Product Feature,* undated reprint from *Prepared Foods* (Copyrighted 1991 by Gorman Publishing Company).

"The Digitisation of Field Instruments" W. Van Der Bijl, *Journal A,* vol. 32, No. 3, 1991, pp. 62–65.

"Low Cost Electronic Flow Measurement System," *Tech Profile,* May 1993, Gas Research Institute, Chicago, IL.

"Development of an Integrated EFM Device for Orifice Meter Custody Transfer Applications," S. D. Nieberle et al., *American Gas Association Distribution/Transmission Conference & Exhibit,* May 19, 1993.

Advertisement, AccuRate Model 3308 Integral Smart DP/P/T Transmitter, (undated) Bristol Babcock, Inc., Watertown, CT 06795

Advertisement, Model 3508 DP Transmitter, *Control Engineering,* Dec. 1992, Bristol Babcock, Inc., Watertown, CT 06795.

"Smart Transmitters Tear Up The Market," C. Polsonetti, *Intech,* Jul. 1993, pp. 42–45.

TRANSMITTER HAVING INPUT FOR RECEIVING A PROCESS VARIABLE FROM A REMOTE SENSOR

REFERENCE

This application is a continuation-in-part of U.S. patent application Ser. No. 08/124,246, "Multivariable Transmitter", filed Sep. 20, 1993, now abandoned.

Cross reference is made to co-pending application Ser. No. 08/117,479, now abandoned filed Sep. 7, 1993, assigned to the same assignee as the present application, and entitled "Multivariable Transmitter."

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates to a field mounted measurement transmitter measuring a process variable representative of a process, and more particularly, to such transmitters which have a microprocessor.

Measurement transmitters sensing two process variables, such as differential pressure and a line pressure of a fluid flowing in a pipe, are known. The transmitters typically are mounted in the field of a process control industry installation where power consumption is a concern. Measurement transmitters provide a current output representative of the variable they are sensing, where the magnitude of current varies between 4–20 mA as a function of the sensed process variable. The current needed to operate a measurement transmitter must be less than 4 mA in order for the transmitter to adhere to this process control industry communications standard. Other measurement transmitters sense process grade temperature of the fluid. Each of the transmitters requires a costly and potentially unsafe intrusion into the pipe, and each of the transmitters consumes a maximum of 20 mA of current at 12V.

Gas flow computers sometimes include pressure sensing means common to a pressure sensing measurement transmitter. Existing gas flow computers are mounted in process control industry plants for precise process control, in custody transfer applications to monitor the quantity of hydrocarbons transferred and sometimes at well heads to monitor the natural gas or hydrocarbon output of the well. Such flow computers provide an output representative of mass flow rate as a function of three process variables. The three process variables are the differential pressure across an orifice plate in the pipe conducting the flow, the line pressure of the fluid in the pipe and the process temperature of the fluid. Many flow computers receive the three required process variables from separate transmitters, and therefore include only computational capabilities. One existing flow computer has two housings: a first housing which includes differential and line pressure sensors and a second transmitter-like housing which receives an RTD input representative of the fluid temperature. The temperature measurement is signal conditioned in the second housing and transmitted to the first housing where the gas flow is computed.

Methods of measuring natural gas flow are specified in Orifice Metering of Natural Gas and other Related Hydrocarbon Fluids, Parts 1–4, which is commonly known as AGA Report No. 3. Calculating the mass flow rate requires that the compressibility factor for the gas and the orifice discharge coefficient be computed. The compressibility factor is the subject of several standards mandating the manner in which the calculation is made. Computing the compressibility factor according to these standards expends many instruction cycles resulting in a significant amount of computing time for each calculation of mass flow and a large power expenditure. Accordingly, the amount of time between subsequent updates of the mass flow rate output is undesirably long if each update is calculated from a newly computed compressibility factor, so as to slow down a process control loop. Even if the compressibility factor is calculated in the background so as to prevent lengthening the update rate, the mass flow rate output is calculated from a stale compressibility factor which provides poor control when the process changes rapidly. Furthermore, calculation of the compressibility factor entails storage of large numbers of auxiliary constants which also consumes a large amount of power. AGA Report No. 3 Part 4 mandates mass flow rate accuracy of 0.005%, resulting either in slow update times, use of stale compressibility factors in computing mass flow rate or power consumption greater than 4 mA. Similarly, direct calculation of the orifice discharge coefficient requires raising many numbers to non-integer powers, which is computationally intensive for low power applications. This also results in undesirably long times between updates or power consumption greater than mandated by the 4–20 mA industry standard.

There is thus a need for a field mounted multivariable transmitter adaptable for use as a gas flow transmitter having improved update times, but consuming less than 4 mA at 12V of power without sacrificing the accuracy of the calculation.

Another aspect of the present invention relates to pressure measurement devices, and particularly to pressure transmitter systems that respond to pressure at least two discrete locations and that communicate with a separate controller over a two-wire link.

Pressure transmitters having a transmitter housing that includes a differential pressure ("$\Delta P$") transducer fluidically coupled to two pressure ports in the housing, are known. Such transmitters further include in the transmitter housing circuitry coupled to the transducer and communicating the measured $\Delta P$ to a distant controller over a two-wire link. The controller energizes the circuitry over the two-wire link. Fluid conduits such as pipes or manifolds carry a process fluid to the transmitter pressure ports. Typically, process fluid immediately upstream and downstream of an orifice plate is routed to the respective ports, such that the $\Delta P$ measured by the transducer is indicative of process fluid flow rate through the orifice plate.

In some applications it is desired to measure differential process fluid pressure at locations separated from each other by a distance much greater than the scale size of the transmitter housing. To make such a measurement it is known to attach to the above described $\Delta P$ transmitter flexible oil-filled capillary tubes or impulse piping to fluidically transmit the process fluid pressures to the housing pressure ports. However, such arrangements suffer from errors due to differences in height and temperature of the oil-filled capillary tubes.

It is also known to provide a separate pressure transmitter at each of the two process fluid measurement locations, and to electrically couple each of the pressure transmitters to a "hydrostatic interface unit" (HIU). The HIU communicates with the distant controller over a two-wire link, and is powered by a separate unit over a different electrical link. The HIU, in turn, electrically powers and communicates with the pressure transmitters, and performs multiple arithmetic operations on the measured pressures. For example, where the pressure transmitters are mounted on a storage tank of process fluid, the HIU can communicate over the two-wire link a 4–20 mA signal indicative of the process fluid density ρ:

$$\rho = \Delta P \times \left( \frac{1}{z \times g} \right),$$

where ΔP is the process fluid pressure difference between the transmitters, g is gravitational acceleration, and z is the (user-programmed) vertical separation of the fluid measurement locations. This system avoids problems associated with oil-filled capillaries external to the transmitter housing, but has disadvantages of its own such as the need to mount additional electronic devices proximate the measurement site and the need for a separate power supply for the HIU due in part to the large number of calculations performed by the HIU.

BRIEF SUMMARY OF THE INVENTION

The present invention is a transmitter for calculating mass flow rate of a process fluid in a single unit and having low power consumption. A two-wire transmitter sensing process variables representative of a process includes an electronics module housing attached to a sensor module housing. The sensor module housing has a pressure sensor for sensing a pressure process variable representative of the process and has a boss for receiving a signal representative of a second process variable, such as a temperature signal. The transmitter includes appropriate digitizing circuits for the sensed process variables. The electronics housing includes an electronics circuit board having a microprocessor for calculating the mass flow of the fluid through the pipe, and the board also includes electronics for formatting the process variables and for coupling the process variables onto the two-wire circuit. The microprocessor in the electronics housing also calculates a compressibility factor and discharge coefficient according to polynomials of specific forms. A boss is located on the sensor module housing and adapted to fit either shielded twisted pair cabling or conduit.

According to another aspect of the invention, a pressure measurement system includes a transmitter housing including an internal pressure port. A pressure transducer in the housing couples to the pressure port and provides a signal related to pressure to circuitry in the transmitter. The circuitry also receives a non-fluidic signal from an external pressure transducer coupled to a remote pressure port external to the transmitter housing. Electronics in the housing process the signals and provide an output related to pressure at the internal port and at the external port.

BRIEF DESCRIPTION OF THE DRAWINGS

For brevity and ease of discussion, items in some figures bear the same reference numeral as items in earlier figures. Such items bearing the same reference numeral serve the same or similar function.

DETAILED DESCRIPTION OF THE PREFERRED EMBODIMENTS

Figure 1:
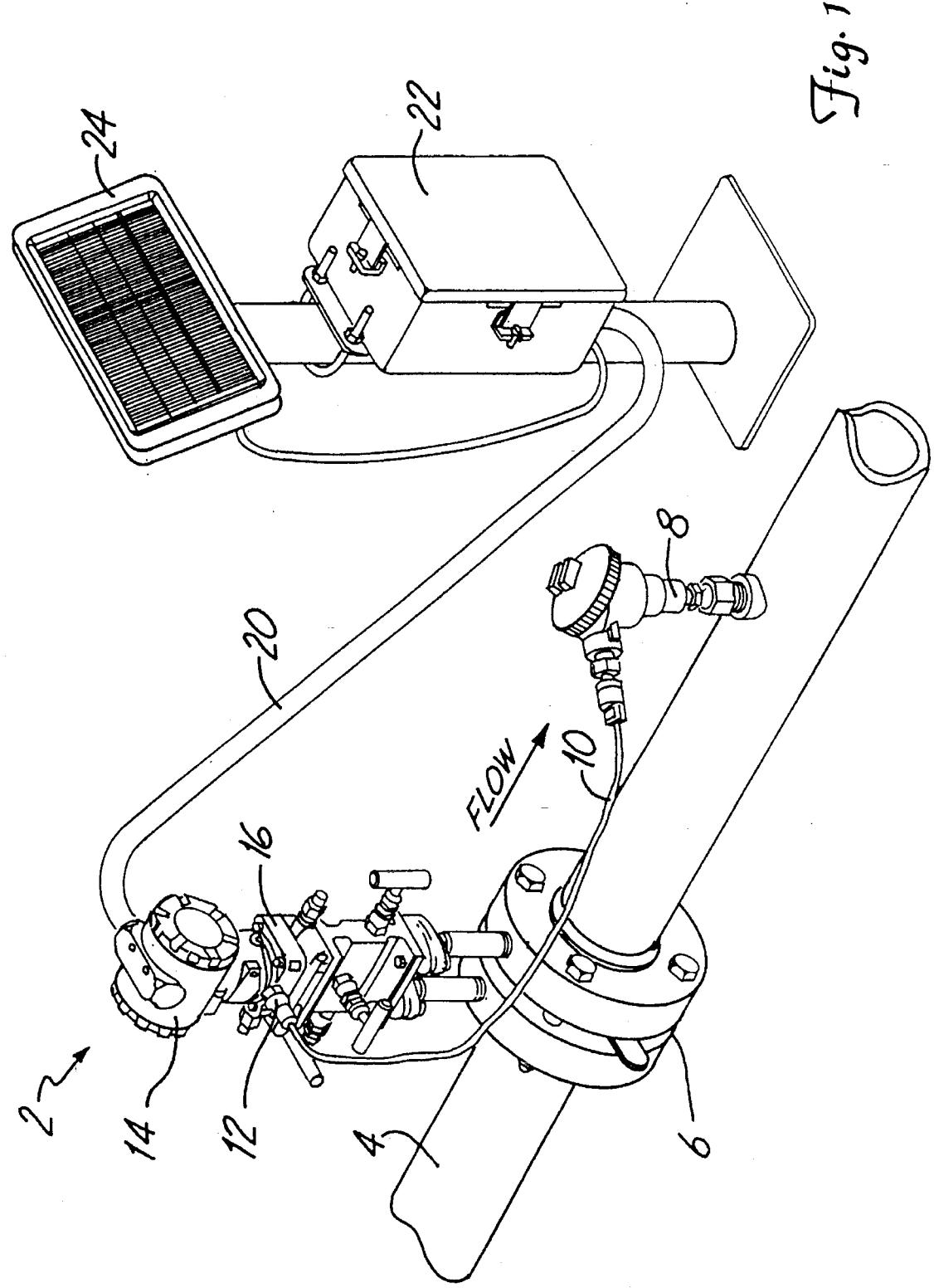
FIG. 1 is a drawing of the present invention connected to a pipe for sensing pressure and temperature therein.

FIG. 1 shows a multivariable transmitter 2 mechanically coupled to a pipe 4 through a pipe flange 6. A flow of natural gas flows through pipe 4. In the invention, transmitter 2 receives differential pressure, absolute pressure and temperature, and provides a multivariable output including mass flow rate with reduced power consumption.

A 100 ohm RTD (resistive temperature device) temperature sensor 8 senses a process temperature downstream from the flow transmitter 2. The analog sensed temperature is transmitted over a cable 10 and enters transmitter 2 through an explosion proof boss 12 on the transmitter body. Transmitter 2 senses differential pressure, absolute pressure and receives an analog process temperature input, all within the same housing. The transmitter body includes an electronics housing 14 which screws down over threads in a sensor module housing 16. Transmitter 2 is connected to pipe 4 via a standard three or five valve manifold. When transmitter 2 is connected as a gas flow computer at a remote site, wiring conduit 20, containing two-wire twisted pair cabling, connects output from transmitter 2 to a battery box 22. Battery box 22 is optionally charged by a solar array 24. In operation as a data logging gas flow computer, transmitter 2 consumes approximately 8 mA of current at 12V, or 96 mW. When transmitter 2 is configured as a high performance multivariable transmitter using a suitable switching power supply, it operates solely on 4–20 mA of current without need for battery backup. This is achieved through reduction techniques discussed below. Switching regulator circuitry (not shown) ensures that transmitter 2 consumes less than 4 mA.

Figure 2:
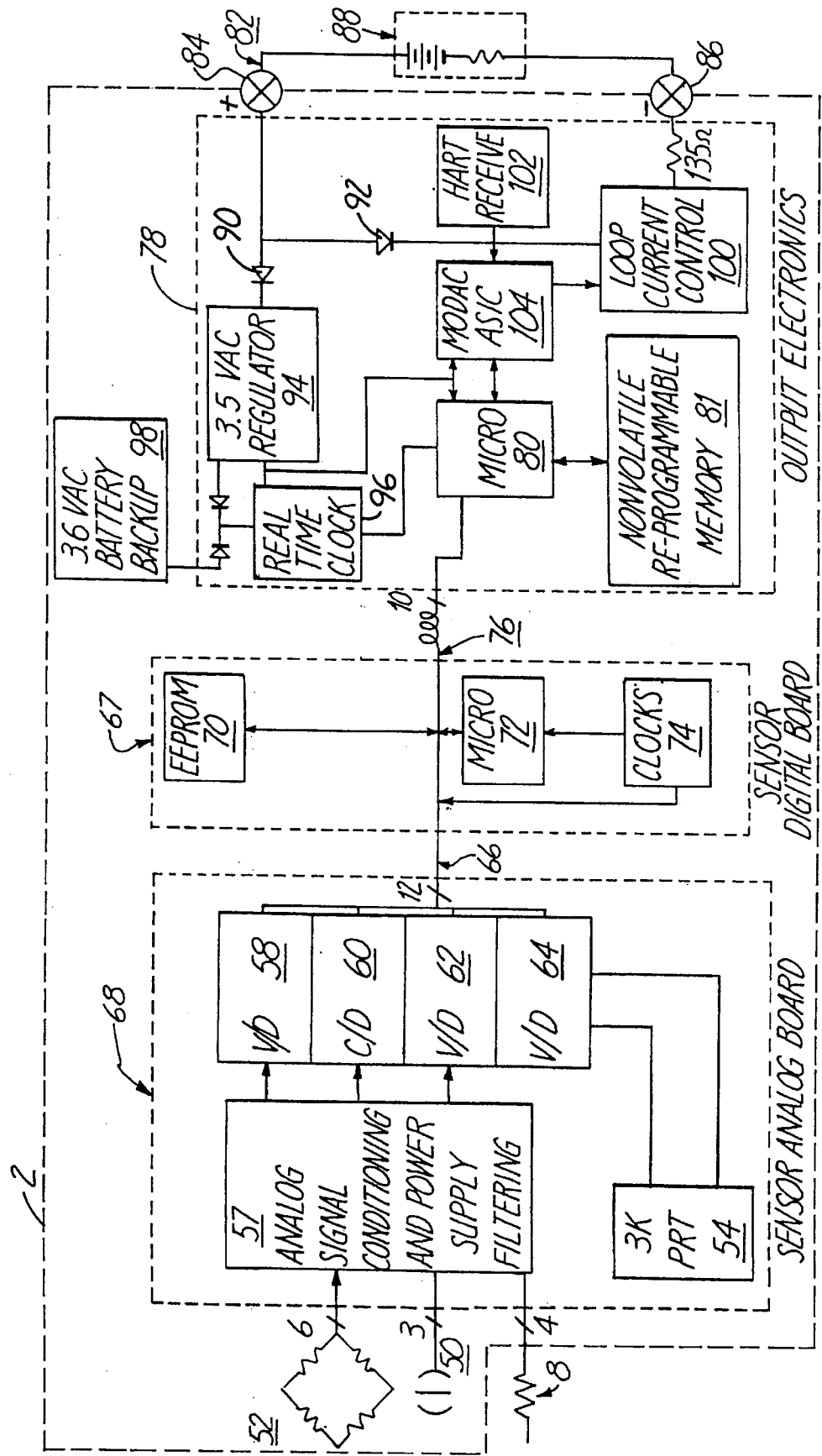
FIG. 2 is a block drawing of the electronics of the present invention.

In FIG. 2, a metal cell capacitance based differential pressure sensor 50 senses the differential pressure across an orifice in pipe 4. A silicon based strain gauge pressure sensor 52 senses the line pressure of the fluid in pipe 4, and 100 ohm RTD sensor 8 senses the process temperature of the fluid in pipe 4 at a location typically downstream from the differential pressure measurement. A low cost silicon based PRT 56 located on a sensor analog board 68 senses the temperature proximate to the pressure sensors 50, 52 and the digitized output from sensor 56 compensates the differential and the line pressure. Analog signal conditioning circuitry 57 filters output from sensors 8, 50 and 52 and also filters supply lines to a set of A/D circuits 58–64. Four low power analog to digital (A/D) circuits 58–64 appropriately digitize the uncompensated sensed process variables and provide four respective 16 bit wide outputs to a shared serial peripheral interface bus (SPI) 66 at appropriate time intervals. A/D circuits 58–64 are voltage or capacitance to digital converters, as appropriate for the input signal to be digitized, and are constructed according to U.S. Pat. Nos. 4,878,012, 5,083,091, 5,119,033 and 5,155,455, assigned to the same assignee as the present invention. Circuitry 57, PRT 56 and A/D circuits 58–64 are physically situated on analog sensor board 68 located in sensor housing 16.

Microprocessor 72 compensates sensed and digitized process variables. A single bus 76 communicates compensated process variables between the sensor housing and electronics housing 14. A second microprocessor 80 in electronics housing 14 computes installation specific parameters as well as arbitrating communications with a master unit (not shown). The dual microprocessor structure of transmitter 2 doubles throughput compared to a single microprocessor unit having the same computing function, and reduces the possibility of aliasing. Aliasing is reduced in the dual micro structure, since it allows the process variable to be converted twice as often as a single microprocessor transmitter with the same update rate. In other words, since compensation and computation is functionally partitioned, the processor 80 does not interleave calculation intensive compensation task with the application and communications task. In transmitter 2 sensor microprocessor 72 provides compensated process variables while the electronics microprocessor 80 simultaneously computes the mass flow using compensated process variables from the previous update period. For example, one installation specific physical parameter is mass flow when transmitter 2 is configured as a gas flow transmitter. Alternatively, transmitter 2 includes suitable sensors and software for turbidity and level measurements when configured as an analytical transmitter. Finally, pulsed output from vortex or turbine meters can be input in place of RTD input (and the digitizing circuitry appropriately altered) and used in calculating mass flow. In various embodiments of the present multivariable transmitter invention, combinations of sensors (differential, gauge, and absolute pressure, process temperature and analytical process variables such as gas sensing, pH and elemental content of fluids) are located and are compensated in sensor module housing 16.

During manufacture of transmitter 2, pressure sensors 50, 52 are individually characterized over temperature and pressure and appropriate correction constants are stored in electrically erasable programmable read only memory (EEPROM) 70. Microprocessor 72 retrieves the characterization constants stored in EEPROM 70 and calculates polynomial to compensate the digitized differential pressure, relative pressure and process temperature. Microprocessor 72 is a Motorola 68HC05C8 processor operating at 3.5 volts in order to conserve power. Sensor digital board 76 is located in sensor housing 16 and includes EEPROM 70, micro 72 and clock circuit 74. The functionality on boards 67 and 68 may be combined through ASIC technology into a single sensor electronics board. Bus 76 includes power signals, 2 handshaking signals and the three signals necessary for SPI signalling. A clock circuit 74 on sensor digital board 67 provides clock signals to microprocessor 72 and to the A/D circuits 58–64.

A Motorola 68HC11F1 microprocessor 80 on output circuit board 78 arbitrates communications requests which transmitter 2 receives over a two-wire circuit 82. When configured as a flow computer, transmitter 2 continually updates the computed mass flow. All the mass flow data is logged in memory 81, which contains up to 35 days worth of such data. When memory 81 is full, the user connects gas flow computer 2 to another medium for analysis of the data. When configured as a multivariable transmitter, transmitter 2 provides the sensed process variables, which includes as appropriate differential pressure, absolute pressure and process temperature.

As discussed above, prior art techniques for calculating mass flow rate are very complex and have large power requirements due to the microprocessor and memory requirements. In the past, reducing power means reducing accuracy of the mass flow rate calculation. The invention overcomes this limitation by characterizing these complex equations as polynomials and storing the coefficients of the polynomials in non-volatile memory. The microprocessor retrieves the coefficients for a fluid at its temperature and calculates mass flow using the simpler (and hence less power intensive) polynomial.

Microprocessor 80 calculates the computation intensive equation for mass flow rate, given as:

$$q_v = 7709.61 \ C_d E_v Y_1 d^2 \sqrt{\frac{P_{f1} Z_s h_w}{G_r Z_{f1} T_f}}$$

where:

$C_d$=coefficient of discharge for flange-tapped orifice meter, d=orifice plate bore diameter, in inches, calculated at flowing temperature ($T_f$), $E_v$=velocity of approach factor, $G_r$=real gas relative density (specific gravity) at standard conditions, $h_w$=orifice differential pressure, in inches of water at 60 degrees F., $P_{f1}$=flowing pressure at upstream tap, in pounds force per square inch absolute, $q_v$=mass flow rate, in standard cubic feet per hour, $T_f$=flowing temperature, in degrees Rankine, $Y_1$=expansion factor (upstream tap), $Z_s$=compressibility factor at standard conditions ($P_s$, $T_s$), and $Z_{f1}$=compressibility factor at upstream flowing conditions ($P_{f1}$, $T_f$).

Figure 3A:
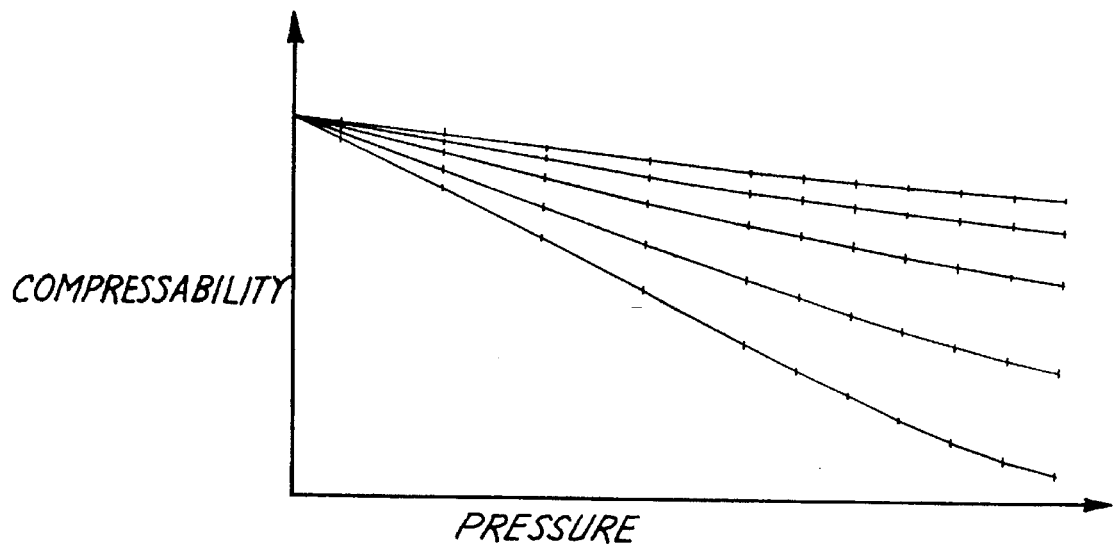
FIG. 3A–B are curves of the compressibility factor as a function of pressure at various temperatures for two fluids.
Figure 3B:
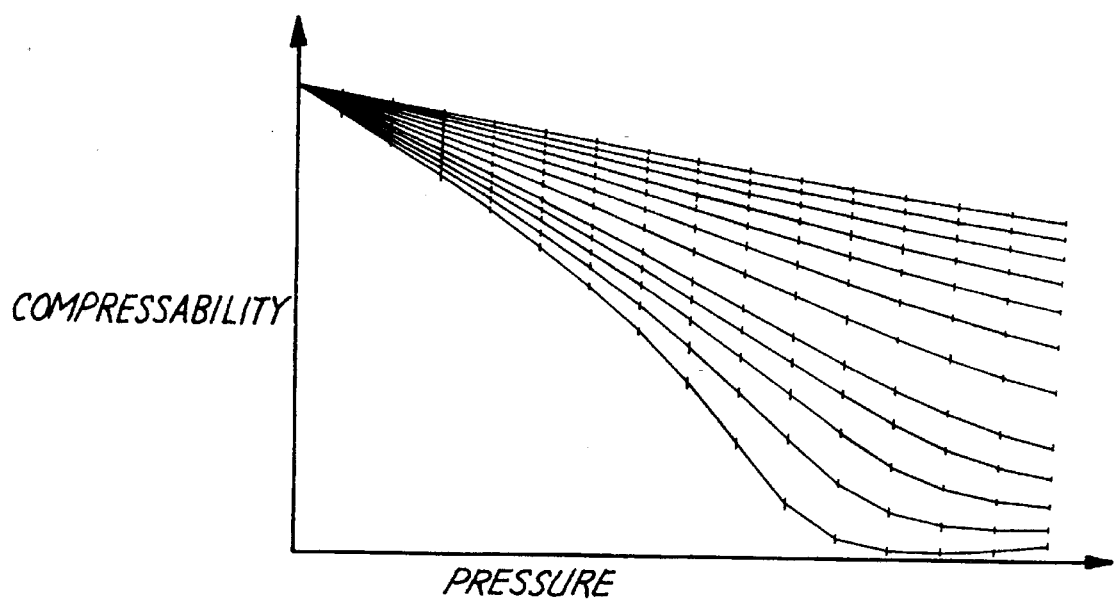

There are a number of standards for calculating gas compressibility factor. The American Gas Association (AGA) promulgated a standard in 1963, detailed in "Manual for the Determination of Supercompressibility Factors for Natural Gas", PAR Research Project NX-19. In 1985, the AGA introduced another guideline for calculating the compressibility factor, "Compressibility and Supercompressibility for Natural Gas and other Hydrocarbon Gases," AGA Transmission Measurement Committee Report No. 8, and in 1992 promulgated "Compressibility Factors of Natural Gas and other Related Hydrocarbon Gases," AGA Report No. 8, for the same purpose.) In AGA Report No. 8 (1992), the compressibility factors, $Z_s$ and $Z_{f1}$, are defined as:

$$z = 1 + \frac{DB}{K^3} - D\Sigma \ C_n^* T^{-u} +$$

$$\Sigma \ C_n^* T^{-u_n}(b_n - c_n k_n D^{k_n}) D^{b_n} \exp(-c_n D^{k_n})$$

where B is a second virial coefficient, K is a mixture size parameter, D is a reduced density, $C_n$ are coefficients which are functions of composition, T is the absolute temperature, and each of the constants include auxiliary constants defined in AGA Report No. 8. Curves of the compressibility factor as a function of pressure at various temperatures are given in FIG. 3A–B, respectively for 100% methane gas and natural gas with a high carbon dioxide content. Direct calculation of the compressibility factors $Z_s$ and $Z_{f1}$ is very computationally intensive when a fluid contains a large number of constituents. Microprocessor 80 calculates these compressibility factors using coefficients derived from least squares minimized techniques. As the number of fluids contemplated for use with the present invention is large, and the magnitude of the compressibility factor varies significantly, it is preferable to use polynomials of the form:

$$Z = \sum_i \sum_j A_{ij} \frac{P^i}{T^j}$$

where $A_{ij}$ is a curve fitting derived constant stored in EEPROM 70, T is the process temperature and P is the absolute pressure, and where i and j take on integer values between −9 and 9, depending on the AGA standard used to calculate the compressibility factor. A 63 term polynomial suffices for most applications. Polynomials of this form and number of terms reduce the amount of computation over direct calculation methods, thereby reducing the time between updates of the mass flow output and the operating power requirements of transmitter 2. Moreover, such a technique obviates a large memory to store great numbers of auxiliary constants, again saving power.

The discharge coefficient, $C_d$, is also very computationally intensive and is given for pipe diameters smaller than 2.8 inches and given by:

$$C_d = 0.5961 + 0.0291\beta^2 - 0.2290\beta^8 + 0.003(1-\beta)(2.8-D) +$$

$$(0.0433 + 0.0712 e^{-8.5/D} -$$

$$0.1145 e^{-6.0/D}) \left[ 1 - 0.23 \left( \frac{19000\beta}{R_d} \right)^{0.8} \right] \frac{\beta}{1-} -$$

$$0.0116 \left[ \frac{2}{D(1-\beta)} - \right.$$

$$\left. 0.52 \left( \frac{2}{D(1-\beta)} \right)^{1.3} \right] \beta^{1.1} \left[ 1 - 0.14 \left( \frac{19000\beta}{R_D} \right)^{0.8} \right] +$$

$$0.000511 \left( \frac{10^6 \beta}{R_D} \right)^{0.7} +$$

$$\left[ 0.021 + 0.0049 \left( \frac{19000\beta}{R_D} \right)^{0.8} \right] \beta^4 \left( \frac{10^6}{R_D} \right)^{0.35}$$

for pipe diameters greater than 2.8 inches, the discharge factor is given by:

$$C_d = 0.5961 + 0.0291\beta^2 - 0.2290\beta^8 +$$

$$(0.0433 + 0.0712 e^{-8.5/D} -$$

$$0.1145 e^{-6.0/D}) \left[ 1 - 0.23 \left( \frac{19000\beta}{R_d} \right)^{0.8} \right] \frac{\beta}{1-} -$$

$$0.0116 \left[ \frac{2}{D(1-\beta)} - \right.$$

$$\left. 0.52 \left( \frac{2}{D(1-\beta)} \right)^{1.3} \right] \beta^{1.1} \left[ 1 - 0.14 \left( \frac{19000\beta}{R_D} \right)^{0.8} \right] +$$

$$0.000511 \left( \frac{10^6 \beta}{R_D} \right)^{0.7} +$$

-continued $$\left[ 0.021 + 0.0049 \left( \frac{19000\beta}{R_D} \right)^{0.8} \right] \beta^4 \left( \frac{10^6}{R_D} \right)^{0.35}$$

where $\beta = d/D$, d is the orifice bore diameter, D is the pipe internal diameter, $R_D$ is the Reynolds number given by $R_D = \rho V D/\mu$, where $\rho$ is the fluid density, V is the average flow velocity in the pipe and $\mu$ is the fluid viscosity. As with the compressibility factor, the discharge factor is preferably curve fit, but using polynomials of the form, $$C_D = \sum_{i=0}^{7} a_i f(R_D)^i + \frac{\sum_{j=0}^{3} b_j \beta^j}{R_D}$$

where $b_j$ is calculated empirically and $\beta$ is as previously defined. Polynomials of this form reduce the amount of computation over direct calculation methods, reducing the time between updates of the mass flow output and the operating power requirements of transmitter 2.

Transmitter 2 has a positive terminal 84 and a negative terminal 86, and when configured as a flow computer, is either powered by battery while logging up to 35 days of mass flow data, by a conventional DC power supply. When transmitter 2 is configured as a high performance multivariable transmitter, terminals 84, 86 are connected to two terminals of a DCS controller 88 (modelled by a resistor and a power supply). In this mode, transmitter 2 communicates according to a HART® communications protocol, where controller 88 is the master and transmitter 2 is a slave. Other communications protocols common to the process control industry may be used, with appropriate modifications to microprocessor code and to encoding circuitry. Analog loop current control circuit 100 receives an analog voltage signal from a digital to analog converter in an ASIC 104 and provides a 4–20 mA current output representative of any of the process variables. HART® receive circuit 102 extracts digital signals received from controller 88 over two-wire circuit 82, and provides the digital signals to ASIC 104 which demodulates such signals according to the HART® protocol and also modulates digital signals for transmission onto two-wire circuit 88. Circuit 104 includes a Bell 202 compatible modem.

A clock circuit 96 provides a real time clock signal to log absolute time corresponding to a logged mass flow value. Optional battery 98 provides backup power for the real time clock 96. When transmitter 2 is configured as a multivariable transmitter, power intensive memory 81 is no longer needed, and the switching regulator power supply is obviated. Diodes 90, 92 provide reverse protection and isolation for circuitry within transmitter 2. A switching regulator power supply circuit 94, or a flying charged capacitor power supply design, provides 3.5V and other reference voltages to circuitry on output board 78, sensor digital board 67 and sensor analog board 68.

Figure 4A:
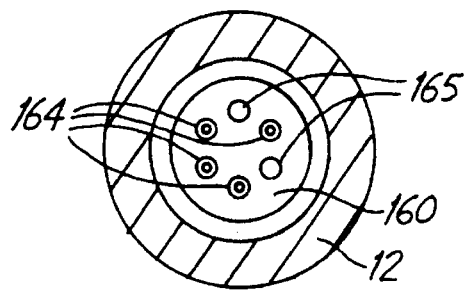
FIG. 4A is a section of the boss and plate taken along lines 4A—4A.
Figure 4:
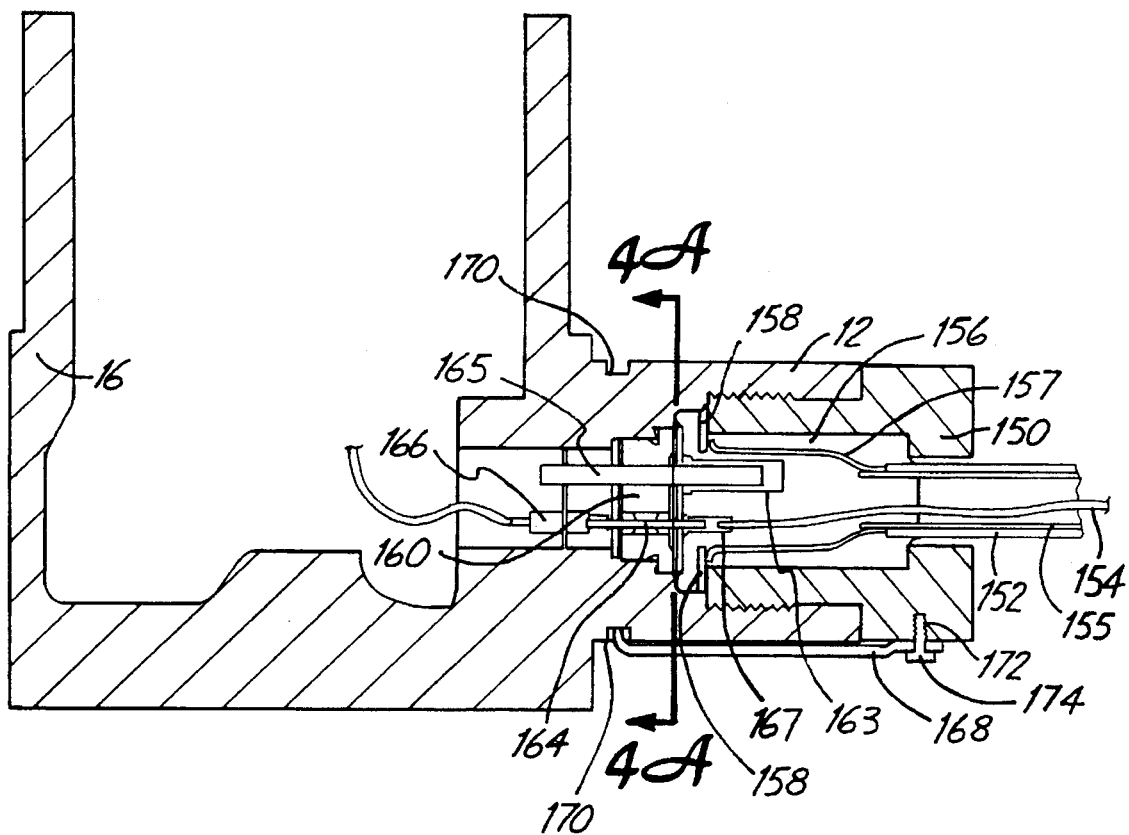
FIG. 4 is a modified cross sectional drawing, showing areas of interest for the present invention.

In FIG. 4, sensor housing 16 of measurement transmitter 2 is shown with boss 12 in detail, along with a hexagonally shaped cable retainer 150. Boss 12 is adaptable for use with cables carrying both analog and digital signals representative of a process variable. Although a cylindrical bulkhead protruding from sensor housing 16 is shown, the present invention is practicable with a flush signal input. Furthermore, boss 12 is shown as integral to housing 16, but can be screwed in, laser welded or otherwise joined. Armored cabling 152 includes 4 signal wires 154 for a 4 wire resistive measurement, but may include other numbers of signal wires as appropriate. Armored cabling 152 has a conductive shield 155 protecting signal wires 154 from EMI interference and terminates in a rubber plug 156 having a grounding washer 158 with copper grounding tape 157. Shield 155 is electrically connected to grounding washer 158 with copper tape 157. Two guide sockets 163 and four signal connector sockets 167 mate to guidepins 165 and feedthroughs 164 in a grounded plate 160 which is welded into boss 12. Plate 160 is preferably fashioned out of stainless steel to resist corrosive environments. The armored cable assembly comprising armored cable 152, rubber plug 156, washer 158, sockets 167 and 163, copper tape 157, is mated to grounded plate 160 in bulkhead 12 and then threaded hex retainer 150 slides over the cable assembly and is screwed into the straight inner diameter threads of bulkhead 12. The straight threads on boss 12 stress isolate housing 16 from stresses induced by ½" NPT conduit, which undesirably affect the accuracy of the sensed pressure process variables.

Figure 5:
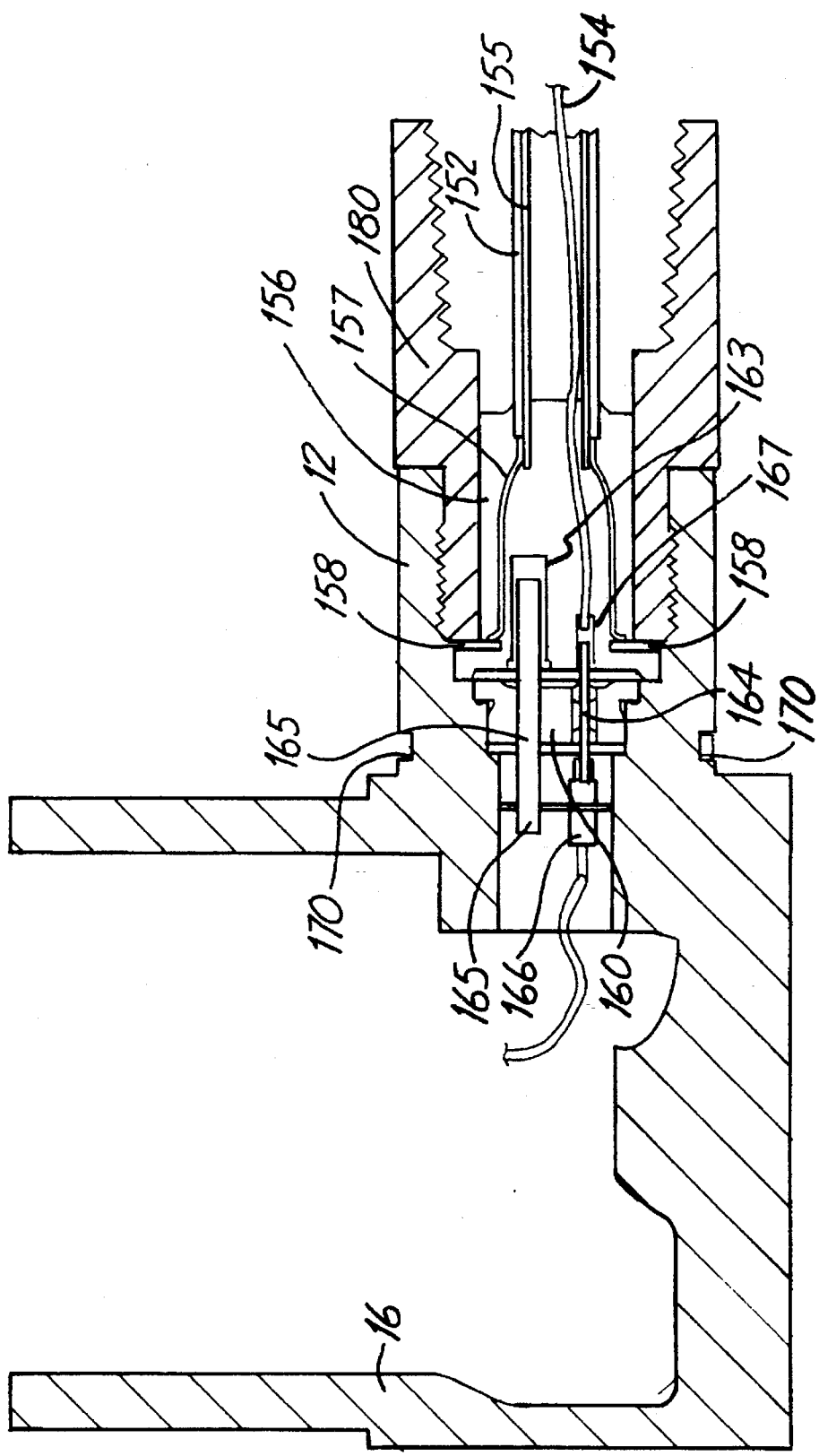
FIG. 5 is a cross sectional drawing of the present invention shown with a conduit adapted connector.

In back of plate 160, feedthrough pins 164 connect to optional electrostatic and EMI filters 166, designed to minimize interference from electrically noisy field locations. Feedthrough pins 164 are potted in glass so that grounded plate 160 seals the interior of transmitter 2 from the environment. As transmitter 2 may be mounted in areas where hazardous and/or explosive gases are present, an explosion proof clamp 168 fits between a groove 170 in boss 12 and a screw hole 172 in hex retainer 150. A screw 174 securely fastens explosion proof clamp 168 in place. When the present invention is mounted in explosion proof installations, hex retainer 150 is replaced by an conduit connector 180 as shown in FIG. 5. Connector 180 has inner diameter threads adapted to receive ½ inch conduit commonly used in the process control industry. Explosion proof clamp 168 may also be used with this adaptation of the present invention. The location of boss 12 as integral to sensor module housing 16 is preferred since the signal does not travel through the electronics housing where noisy digital signals are present. Rather, such a location minimizes the distance which the uncompensated temperature signal must travel before digitization by sensor micro 72. Furthermore, a direct connection to the electronics housing could allow condensation to enter the housing. Entering through the sensor module provides modularity between units because the compensation and signal conditioning steps are performed in the same sensor module. The dual microprocessor structure coupled with the boss 12 on sensor module 16 provides reduced power consumption for the three process variable measurement, reduces the compensation errors in each of the three variables and provides a smaller housing with less weight than existing transmitters designed with mass flow rate outputs.

Figure 6:
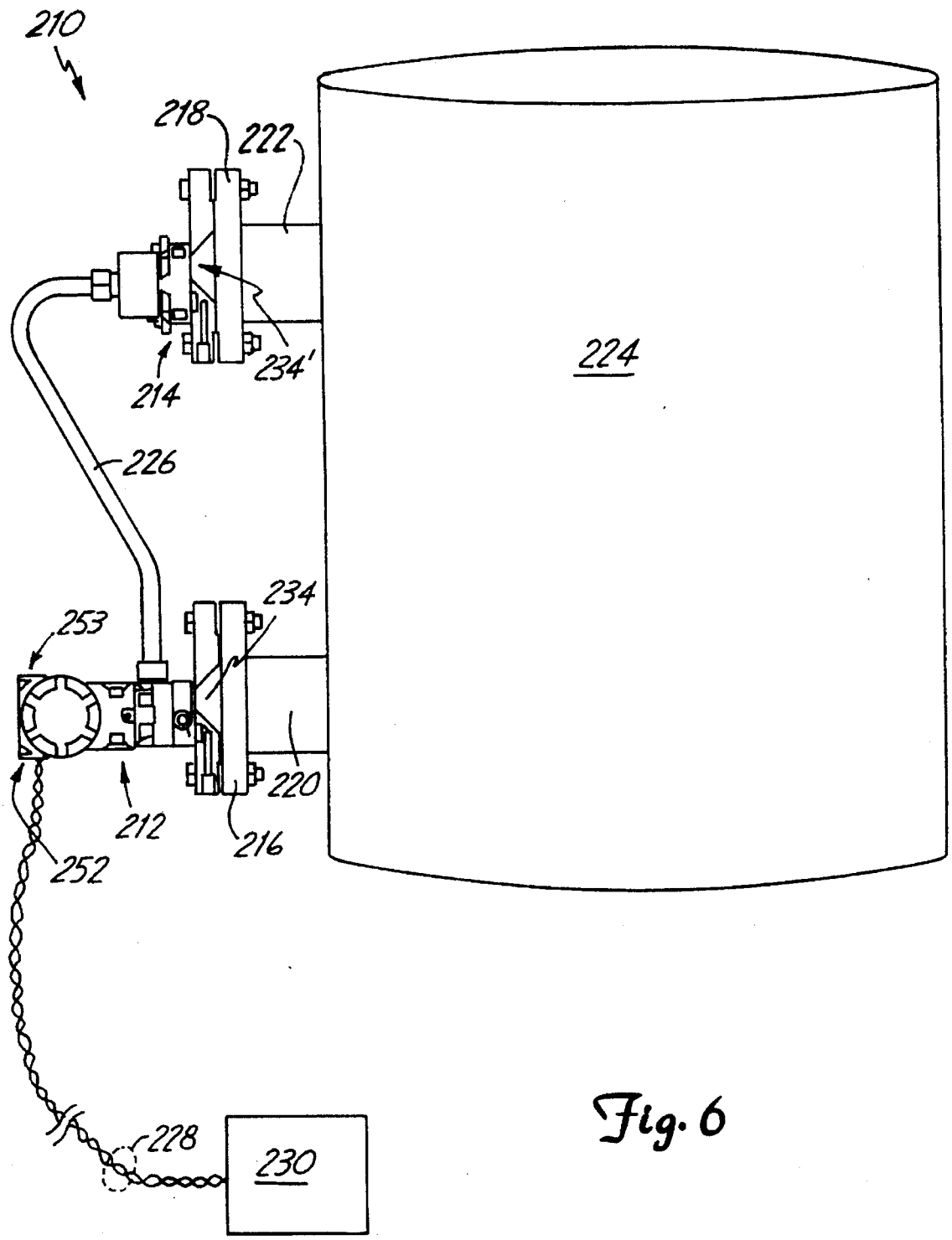
FIG. 6 is an elevational view, partially in block diagram and partially in section, of an arrangement for measuring differential pressure in accordance with the invention.

In FIG. 6, differential pressure measurement system 210 includes a "master" pressure transmitter 212 and a "slave" pressure transmitter 214. Pressure transmitters 212, 214 bolt to flanges 216, 218, respectively, at ports 220, 222 on storage tank 224. Tank 224 holds a process fluid (not shown). System 210 measures a hydrostatic pressure differential of the process fluid between ports 220, 222. The distance between ports 220, 222 is on the order of or greater than the size of one of the transmitters 212, 214, such that the measurement cannot be made with a single transmitter unless oil-filled capillary tube extensions or impulse piping are used. Each of the transmitters 212, 214 includes a pressure transducer and, preferably, preconditioning electronics to provide an electrical output indicative of the process fluid pressure at the respective port 220, 222. Transmitters 212, 214 can measure an absolute pressure, a differential pressure, or (as shown) a gauge pressure of the process fluid at the respective ports 220, 222, but preferably they make the same type of measurement to reduce atmospheric pressure effects.

Slave transmitter 214 conveys to master transmitter 212 an electrical representation of the process fluid pressure at port 222 via electrical connection 226. Connection 226 can comprise a shielded multiple-conductor cable with standard multi-pin electrical connectors affixed at both ends, or it can comprise bendable tubular conduit with one or more wires running therethrough. Such conduit protects and, if it is electrically conductive, electrically shields the wire or wires from electromagnetic interference.

Master transmitter 212, in addition to measuring the process fluid pressure at port 220, calculates a process fluid pressure difference between ports 220 and 222 by calculating a difference between the pressure measurements made by transmitters 212, 214. If pressure transmitters 212, 214 are configured for gauge pressure measurement, the computed difference between their outputs will include a contribution due to the atmospheric pressure difference between the two pressure transmitter locations. This atmospheric contribution can be corrected for by an offset adjustment within master transmitter 212, or, depending upon desired system accuracy and vertical separation of transmitters 212, 214, can be ignored.

Control system 230 sends commands to and receives signals from master transmitter 212 over two-wire link 228 (preferably in a HART® format, available from Rosemount Inc., Eden Prairie, Minn., U.S.A.), and master transmitter 212 can, if desired, communicate in like manner with slave transmitter 214. Control system 230 energizes master transmitter 212 over link 228, and master transmitter 212 in turn energizes slave transmitter 214 over connection 226. Preferably, master transmitter 212 adjusts the electrical current flowing through link 228 between 4 mA and 20 maas an indication of the calculated process fluid pressure difference.

Figure 7:
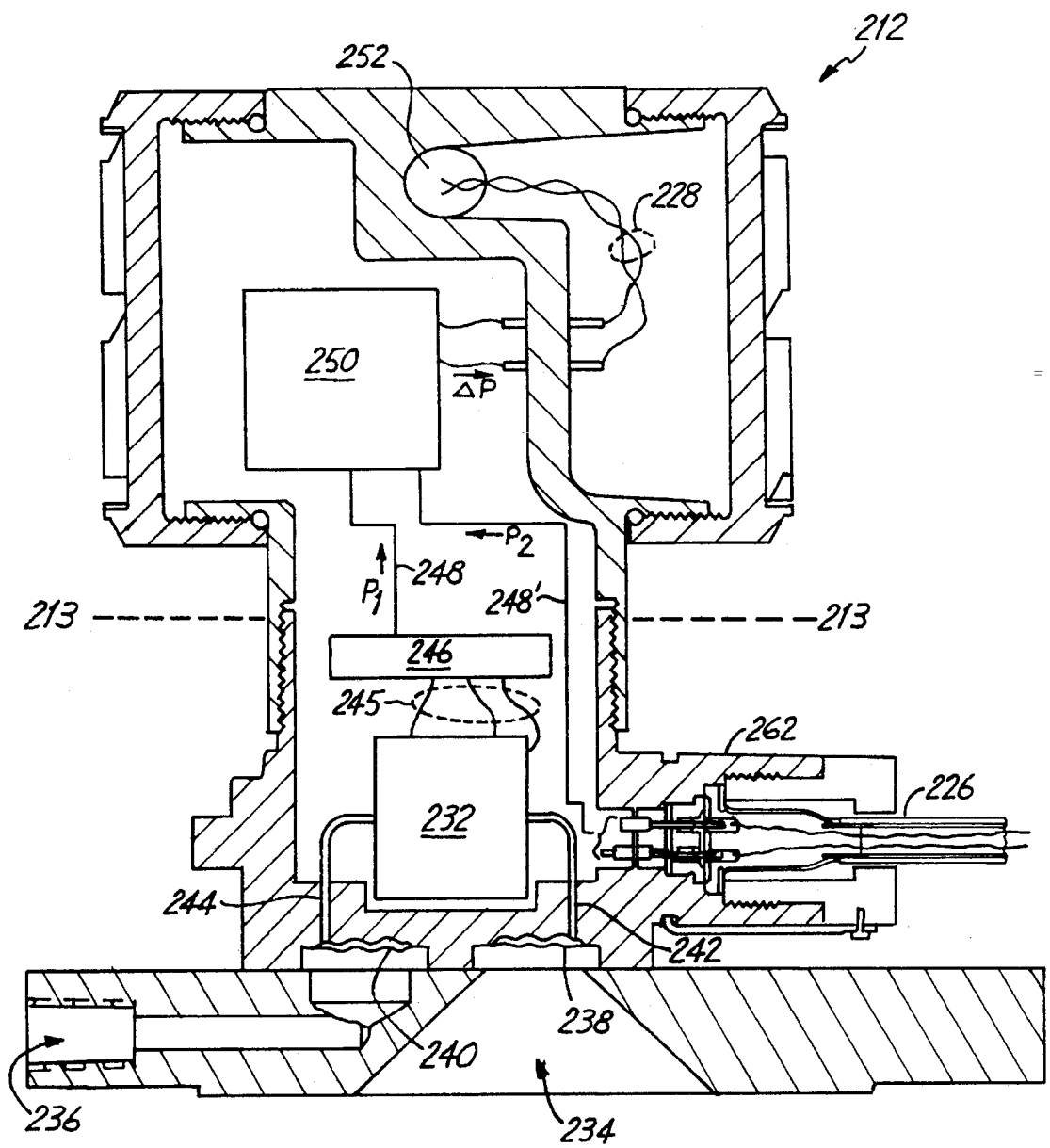
FIG. 7 is a sectional view, partially in block diagram, of a master pressure transmitter in accordance with the invention.

Master pressure transmitter 212 is shown in greater detail in FIG. 7. For clarity, the portion of the transmitter housing above line 213—213 is shown rotated 90° relative to transmitter housing portions below line 213—213. A pressure transducer 232, preferably a capacitive cell as described in U.S. Pat. Nos. 4,370,890 and 4,612,812, responds to a difference in pressure between process fluid at pressure port 234 and ambient air at pressure port 236. As shown, transducer 232 couples to the pressure ports via isolator diaphragms 238, 240 and passageways 242, 244 filled with, for example, silicone oil. Pressure transducer 232 can alternately measure absolute pressure of process fluid at port 234, in which case port 236, diaphragm 240, and passageway 244 can be eliminated. Measurement circuitry 246 couples to transducer 232 by wires 245, and provides a first pressure output $P_1$ on link 248 responsive to the relative or absolute pressure at port 234. Link 248, and other electrical connections in the figures, are drawn with a thickened line to make it clear that they can comprise multiple independent conductors. Preferably, circuitry 246 includes a thermistor or other temperature sensor (see FIG. 10), which is in close thermal communication with transducer 232 and which is used by circuitry 246 to compensate for thermal characteristics of transducer 232. Hence, first pressure output $P_1$ on link 248 has reduced sensitivity to temperature variations at master transmitter 212.

Advantageously, master transmitter 212 includes ΔP calculation circuitry 250 which receives the first pressure output $P_1$ over link 248 and a second pressure output $P_2$ over link 248', and calculates therefrom the pressure difference $\Delta P = P_2 - P_1$. Measurement $P_2$ is indicative of the relative or absolute pressure at port 234', and, like $P_1$, is temperature compensated. Circuitry 250 then communicates the pressure difference ΔP over link 228 through communication port 252 in transmitter 212 housing to control unit 230. In the embodiment shown in FIGS. 6 and 7, $P_1$ and $P_2$ are themselves both differential pressure measurements since they are indicative of gauge pressure. Circuitry 250 also serves to power circuitry 246 over link 248 and corresponding circuitry 246' in slave transmitter 214 (see FIG. 9a) over link 248'. Use of the dual transmitters 212, 214 and inclusion of ΔP calculation circuitry 250 in master pressure transmitter 212 eliminates the need for external oil-filled capillaries, as well as the need for a separate computational unit or the need for control unit 230 to perform such calculations.

Figure 8:
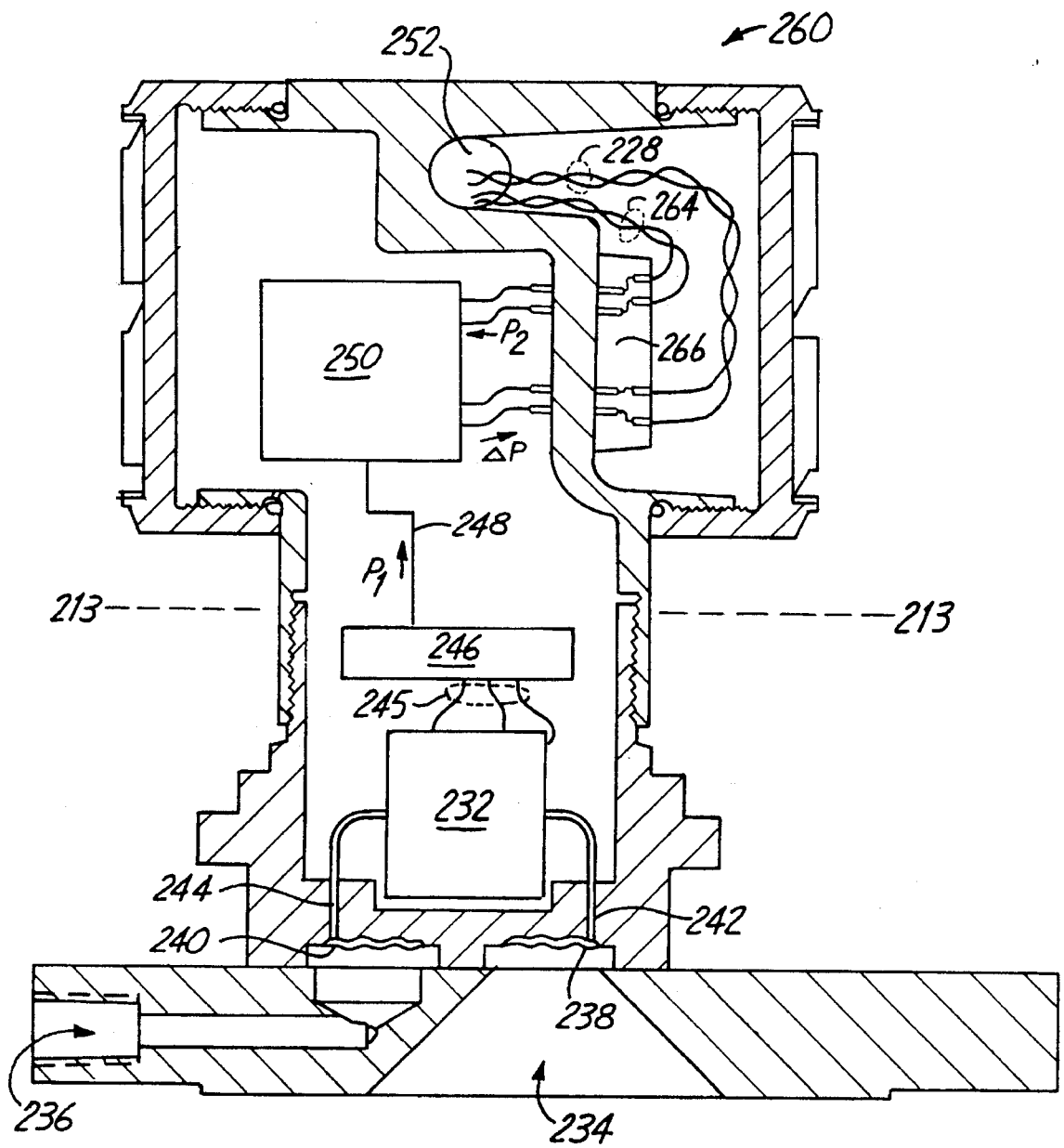
FIG. 8 is a sectional view, partially in block diagram, of an alternate master pressure transmitter in accordance with the invention.

FIG. 8 shows an alternative master transmitter 260 similar to master transmitter 212 of FIG. 7, with similar items bearing the same reference number. The boss 262 near the base of transmitter 212, which comprised a dedicated communication port to receive the electrical signal indicative of pressure, has been eliminated in transmitter 260. Instead, circuitry 50 couples to slave transmitter 214 over wires 264 which enter the transmitter housing through one of the two standard communication ports at the top of the transmitter (see ports 252, 253 of transmitter 212 in FIG. 6). Wires 228, 264 couple to circuitry 250 via terminal block 266 and feedthroughs which penetrate the transmitter housing wall. By eliminating the need for boss 262 and for a dedicated cable connection 226, a differential pressure system incorporating transmitter 260 rather than transmitter 212 can be made at a reduced cost.

Figure 9A:
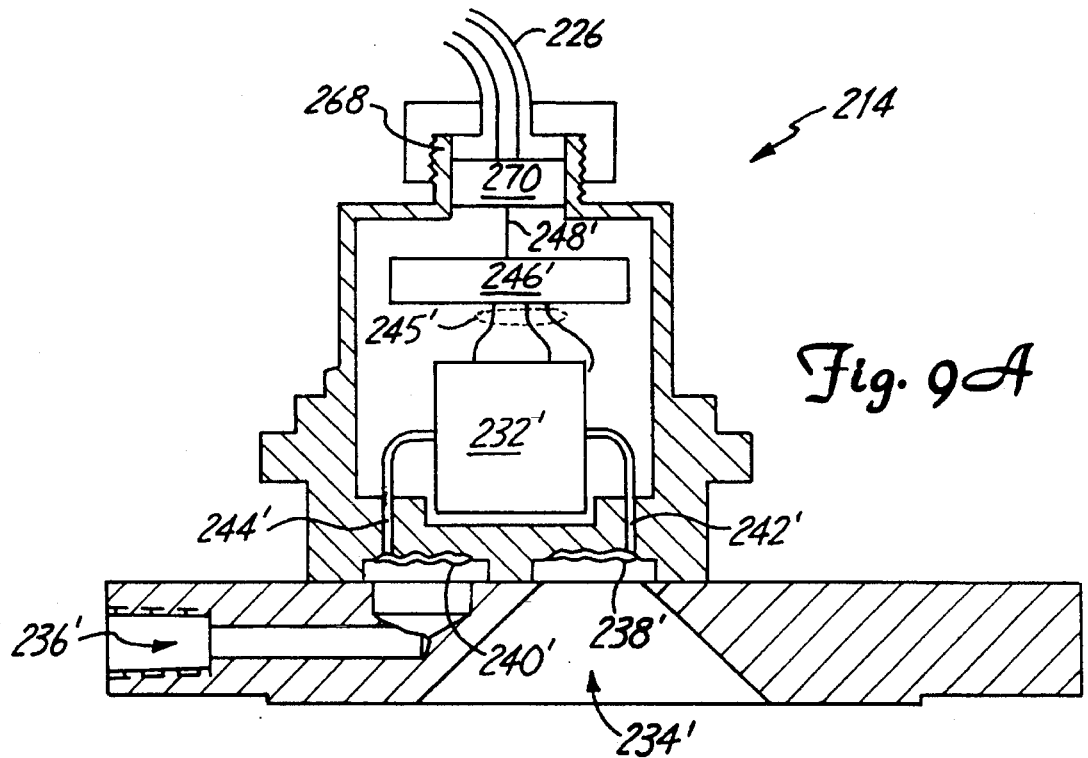
FIGS. 9A and 9B are sectional views, partially in block diagram, of slave pressure transmitters in accordance with the invention.

FIG. 9a shows slave pressure transmitter 214 from FIG. 6 in greater detail. Primed reference numerals identify components having the same function as previously discussed components having corresponding unprimed reference numerals. Primes (') have been added to associate the numbered component with slave pressure transmitter 214. Advantageously, slave transmitter 214 uses a pressure transmitter 232' and measurement circuitry 246' substantially the same as corresponding transmitter 232 and circuitry 246 of master transmitter 212 or 260. Such duplication of parts reduces manufacturing inventory and lowers cost. Connection 226 enters slave pressure transmitter 214 through a sole communication port 268. Connection 226 terminates in a multiple-pin connector affixed at its end, which reversibly joins to a mating member 270, thereby to complete the electrical link 248'.

Figure 9B:
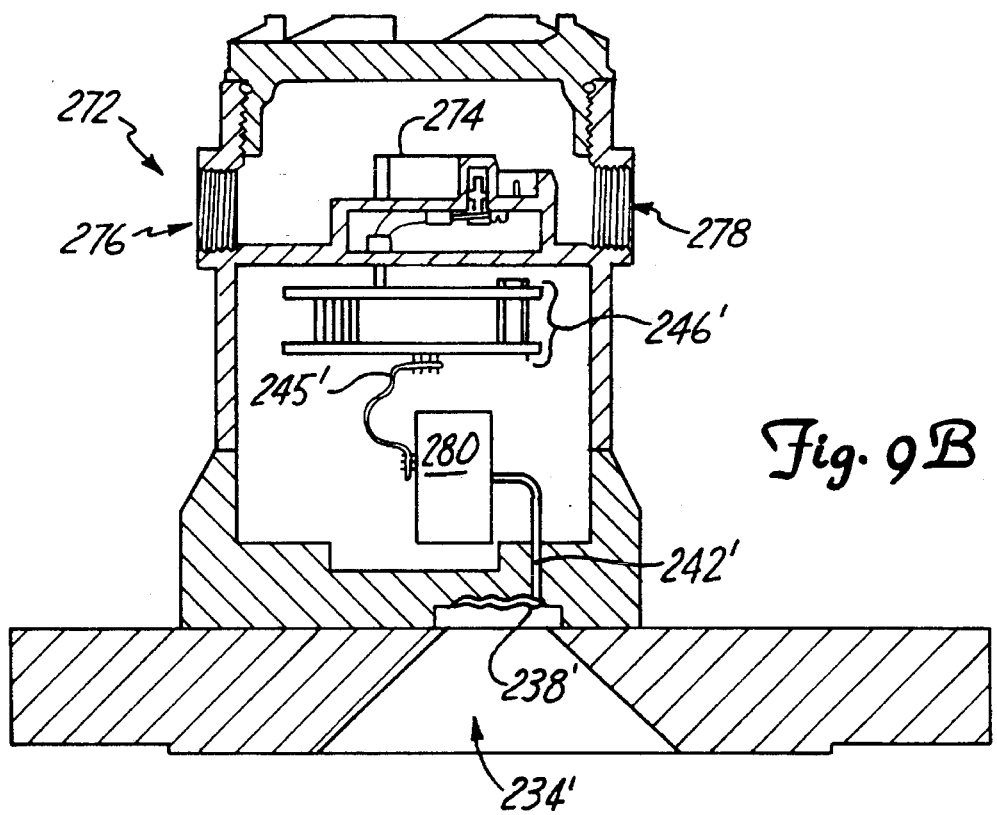

FIG. 9b shows an alternative slave transmitter 272 which uses a terminal block 274 and communication ports 276, 278 in place of port 268 and mating member 270 from transmitter 214. Such substitution permits the customer to use standard metal conduit with feedthrough wires to connect the slave transmitter to the master transmitter. Slave transmitter 272 can be used with master transmitter 260 as a differential pressure measurement system. Measurement circuitry 246', discussed above, is shown as a pair of circuit boards coupled together coupled to transducer 280 through ribbon cable 245'. Transmitter 272 comprises pressure transducer 280, which measures the absolute pressure of the process fluid at pressure port 234'.

Figure 10:
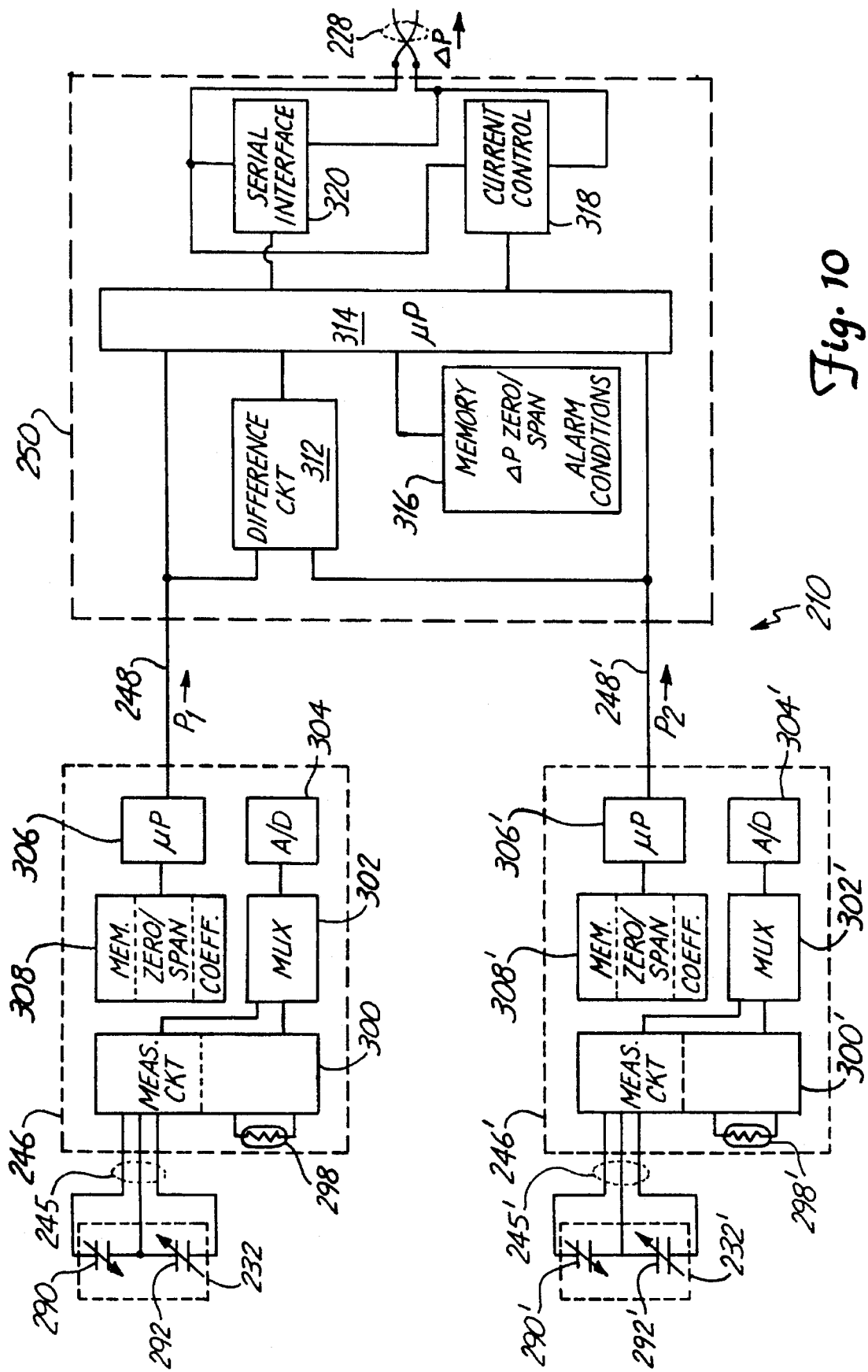
FIG. 10 is an electrical block diagram of the differential pressure measurement system of FIG. 6.

FIG. 10 is an electrical block diagram of the differential pressure measurement system shown in FIGS. 6, 7, and 9a. System 210 includes calculation circuitry 250 coupled to transducers 232 and 232'. FIG. 10 shows measurement circuitry 246 in more detail. Circuitry 246 couples via lines 245 to capacitors 290 and 292 in transducer 232. Capacitors 290 and 292 can be configured to measure differential pressure. Circuitry 246 includes a resistance temperature device (RTD) 298 coupled to measurement input circuitry 300 which also couples to capacitors 290 and 292 of transducer 232. Analog-to-digital converter 304 selectively couples to transducer 232 or RTD 298 through multiplexer 302 and circuitry 300. Analog-to-digital converter 304 couples to microprocessor 306 which also connects to memory 308. Memory 308 contains various information including information regarding zero and span, and various coefficients for correction of, for example, nonlinearity of transducer 232 output with pressure and variation of transducer 232 output with temperature. Microprocessor 306 communicates with calculation circuitry 250 over line 248, providing a pressure output P1 as a function of transducer 232 output adjusted by the zero and span values and corrected by the correction coefficients together with the RTD 298 output. Circuitry 250 can program the contents of memory 308 over line 248.

Circuitry 250 includes difference circuit 312, microprocessor 314 and memory 316. Microprocessor 314 couples to circuitry 246 and 246', difference circuit 312, memory 316, current control 318, and serial interface 320. Difference circuit 312 also receives the outputs of 246 and 246'. Microprocessor 314 communicates with circuitry 246, 246' through connections 248, 248'. Microprocessor 314 controls microprocessor 306 to configure circuitry 246. Further, pressure information is provided directly to microprocessor 314 and pressure differential ΔP is provided to microprocessor 314 through difference circuit 312. Microprocessor 314 communicates over two-wire link 228 and controls the current flowing through loop 228 using current control circuitry 318 in response to measured pressure values. Serial interface 320 is used for digital communications over current loop 228.

Microprocessors 306 and 306' in circuitry 246 and 246', respectively, perform correction and compensation functions on the pressure sensed by sensors 232 and 232', respectively. Microprocessors 306, 306' use correction coefficients stored in memory 308, 308'. Thus, units 246, 246' are easily interchangeable and can be individually calibrated during manufacture.

Typical prior art schemes for measuring pressure from a remote location which is separated from the transmitter use a small capillary filled with oil to communicate with the remote transducer, as described in the Background section.

The present invention offers a number of advantages over the prior art. Sensor measurements from a remote location are immediately converted into an electrical signal. The electrical signal can be compensated at the remote location whereby the signal provided to the transmitter has a high level of accuracy. In operation, the system shown in FIG. 10 communicates with circuits 246 and 246' over connections 248 and 248'. As shown in FIG. 7, circuitry 246 and transducer 232 reside in transmitter 212. Circuitry 246' and transducer 232' reside in a separate enclosure, separated from transmitter 212. In the embodiment shown in FIG. 6, circuitry 246' resides in slave transmitter 214. Note that although unit 214 has been described as a "transmitter," unit 214 may comprise any type of remote transducing equipment which provides an electrical, or other non-fluidic, output signals to transmitter 212.

Circuitry 250 also provides various alarms. Circuitry 250 sends a "HI" alarm condition signal to control unit 230 by causing the signal on wires 228 to exceed a normal range and sends a "LO" alarm condition signal by causing the signal to fall below a normal range. The alarm can be triggered by circuitry 250 for a number of conditions including the occurrence of P1, P2 or ΔP falling outside of a predetermined range. This information is used to set a warning condition by forcing the loop current to a saturated high or low value. Other parameters could be examined for warning conditions, such as density.

Further, the circuitry of system 210 not only provides zero, span, and correction coefficients individually for pressures P1 and P2 via memory 306 and 306', respectively, it can also provide zero, span, and linearization and temperature correction coefficients for output ΔP via memory 316. Power reduction may be achieved by multiplexing signals carried by lines 248, 248'. In a typical operation, the entire system can be powered by a 4 mA signal and 12 volts received from current loop 228. Although capacitive pressure sensors are shown, other types of pressure transducers can be used such as strain gages. Further, the various electrical connections shown can be replaced with optical connections. For example, the connection between circuitry 250 and circuitry 246' can be one or more optical fibers.

In one embodiment of the invention shown in FIGS. 6 through 10, master transmitter 212 measures differential pressure across an orifice in a flow tube while slave transmitter 214 is positioned along the flow tube, upstream or downstream from transmitter 212, and measures absolute process fluid pressure.

Although the present invention has been described with reference to preferred embodiments, workers skilled in the art will recognize that changes can be made in form and detail without departing from the spirit and scope of the invention. For example, in addition to temperature and pressure sensors, other sensors and sensor inputs can be used with the invention, such as pH, volumetric or mass flow, conductivity, or gas composition.

What is claimed is:

1. A two-wire transmitter in a process control system for sensing process variables representative of a process, comprising:
   a module housing;
   a pressure sensor coupled to the module housing for sensing a pressure of the process and providing a sensor pressure output;
   a process variable input to the module housing for receiving a process variable signal from an external process variable sensor located outside of a module housing;
   an analog to digital converter coupled to the pressure sensor providing a digital pressure output representative of the sensor pressure output;
   a first microprocessor in the module housing receiving the digital pressure output and providing a compensated output;
   an electronics housing coupled to the module housing;
   a data and power bus coupled to the first microprocessor carrying data and power for the first microprocessor from the electronics housing;
   a second microprocessor in the electronics housing coupled to the data and power bus for receiving the compensated output from the first microprocessor and the process variable signal and responsively calculating a physical parameter related to the process; and
   output circuitry coupled to a two-wire process control loop for receiving the calculated physical parameter from the second microprocessor and responsively transmitting the physical parameter on the two-wire process control loop.

2. The transmitter of claim 1 where the physical parameter is mass flow rate and where the pressure sensor senses a differential pressure representative of the process, and where the sensor module housing further comprises a second sensor sensing a line pressure representative of the process and a third sensor sensing a process temperature representative of the process.

3. The two-wire transmitter of claim 2 wherein the second microprocessor calculates mass flow rate of process fluid as a function of coefficients stored in a memory.

4. The transmitter of claim 1 including a boss in the housing coupled to the process variable input.

5. The transmitter of claim 4 where the boss is integral to the sensor module housing.

6. The transmitter of claim 4 where the boss is welded into the sensor module housing.

7. The transmitter of claim 4 where the boss is screwed into the sensor module housing.

8. The transmitter of claim 4 where the boss includes a groove on its outer diameter.

9. The transmitter of claim 4 where the boss has straight threads and an adapter screws into the boss.

10. The transmitter of claim 4 where a grounded plate is welded into the boss.

11. The transmitter of claim 1 where a retainer threads into the process variable input, and the retainer secures a four wire cable.

12. The transmitter of claim 1 where a retainer threads into the process variable input and the retainer has a threaded inner diameter for connecting to conduit.

13. The transmitter of claim 1 including circuitry coupled to the two-wire process control loop to receive power from the loop to completely power the transmitter.

14. A measurement transmitter for use in a process control system for providing the mass flow of a fluid flowing through a pipe, the transmitter communicating over a two-wire circuit, the transmitter comprising:
   a housing;
   sensing means in the housing for sensing process variables representative of a differential pressure and a line pressure;
   means for receiving an input signal from a temperature sensor outside the housing representative of the temperature of the fluid in the pipe;
   analog to digital conversion means in the housing for digitizing the sensed process variables and the input signal;
   electronics means in the housing for providing the mass flow rate of the fluid as a function of the digitized process variables and the digitized input signal, where the electronic means calculates the mass flow rate using a compressibility factor of the form, $$z = \sum_i \sum_j A_{ij} \frac{P^j}{T^i}$$

output circuitry coupled to the two-wire process control loop for receiving the mass flow rate from the electronics means and transmitting the mass flow rate on the two-wire process control loop; and
   circuitry coupled to the two-wire process control loop to receive power from the loop to completely power the transmitter.

15. The measurement transmitter of claim 14 wherein the output circuitry formats the process variables and couples the process variables to the two-wire circuit.

16. A measurement transmitter for use in a process control system for providing the mass flow of a fluid flowing through a pipe, the transmitter communicating over a two-wire circuit, the transmitter comprising:
   a housing;
   sensing means in the housing for sensing process variables representative of a differential pressure and a line pressure;
   means in the housing for receiving an input signal from a temperature sensor outside the housing representative of the temperature of the fluid in the pipe;

analog to digital conversion means in the housing for digitizing the sensed process variables and the input signal;

electronics means in the housing for providing the mass flow rate of the fluid as a function of the digitized process variables and the digitized input signal, where the microcomputer means calculates the mass flow using a discharge coefficient of the form, $$C_d = \sum_i a_i [f(R_D)]^i + \frac{\sum_j b_j \beta^j}{R_D}$$

output circuitry coupled to the two-wire process control loop for receiving the mass flow rate from the electronics means and transmitting the mass flow rate on the two-wire process control loop; and circuitry coupled to the two-wire process control loop to receive power from the loop to completely power the transmitter.

17. The measurement transmitter of claim 16 wherein the output circuitry formats the process variables and couples the process variables to the two-wire circuit.

18. A pressure measurement transmitter for use in a process control system communicating with a control unit, comprising:

a transmitter housing having a first pressure port therein;

a remote housing separated from the transmitter housing having a second pressure port therein;

a first and second pressure transducer disposed respectively in the first transmitter housing and the remote housing and providing respectively first and second transducer outputs indicative of pressure at the first and second pressure ports;

circuitry in the remote housing coupled to the second transducer output responsively providing a non-fluidic transducer signal;

a non-fluidic communication link between the transmitter housing and the remote housing for carrying the non-fluidic pressure signal from the remote housing to the transmitter housing; and circuitry coupled to the control unit and disposed within the transmitter housing, the circuitry receiving the non-fluidic transducer signal over the non-fluidic communication link and receiving the first transducer output, the circuitry providing a circuitry output to the control unit over a two-wire process control loop as a function of the first and second transducer outputs.

19. The measurement transmitter of claim 18, wherein the circuitry output comprises a signal indicative of a pressure difference between the first and second pressure ports.

20. The measurement transmitter of claim 18, wherein the non-fluidic communication link comprises one or more electrical conductors.

21. The measurement transmitter of claim 18 wherein the circuitry compares measured pressure with programmed limits and responsively provides an alarm output.

22. A pressure measurement transmitter in a two-wire process control loop, comprising:

a transducer housing having a first pressure port and a first communication port;

a transmitter housing having a second pressure port and a second and third communication port;

a first and a second pressure transducer disposed respectively in the transducer housing and the transmitter housing and providing respectively a first and second electrical output responsive to pressure at respectively the first and second pressure port;

calculation circuitry disposed in the transmitter housing and coupled to the first electrical output through the first communications port and the second communications port and to the second electrical output, the calculation circuitry calculating a parameter related to pressures at the first and second pressure ports and providing a third electrical output indicative of the parameter; and output circuitry disposed in the transmitter housing transmitting the calculate parameter over the two-wire process control loop through the third communication.

23. The measurement transmitter of claim 22, wherein the calculation circuitry couples to the first electrical output via the first and second communication ports, and the calculation circuitry provides the third electrical output via the third communication port.

24. The measurement transmitter of claim 22, further including a control unit which energizes the calculation circuitry over the two-wire link.

25. The measurement transmitter of either claims 22 or 24, further including:

at least one conductor coupling the calculation circuitry to the first pressure transducer via the first and second communication ports.

26. The measurement transmitter of claim 22, further including:

measurement circuitry disposed in the transducer housing;

wherein the calculation circuitry couples to the first electrical output via the measurement circuitry, and wherein the calculation circuitry energizes the measurement circuitry.

27. The measurement transmitter of claim 22, further including;

measurement circuitry disposed in the transducer housing including means for storing coefficients used to compensate the first electrical output.

28. A transmitter in a two-wire process control loop for measuring a pressure of a process fluid, comprising:

a transmitter housing having a pressure port and a first and second electrical port;

a pressure transducer disposed in the transmitter housing and communicating with the pressure port, the pressure transducer providing an electrical output as a function of the process fluid pressure at the pressure port;

means disposed in the transmitter housing for receiving at the first electrical port an external electrical output indicative of the process fluid pressure at a remote pressure port external to the transmitter housing;

calculation electronics disposed in the transmitter housing and coupled to the receiving means and to the electrical output, the calculation electronics calculating as a function of the external electrical output and the electrical output another pressure of the process fluid; and output circuitry in the transmitter housing for transmitting the other pressure over the two-wire process control loop.

29. The transmitter of claim 28, wherein another pressure represents ΔP between the pressure port and the external pressure port.

* * * * *

UNITED STATES PATENT AND TRADEMARK OFFICE
CERTIFICATE OF CORRECTION

PATENT NO. : 5,606,513
DATED : February 25, 1997
INVENTOR(S) : Bennett L. Louwagie et al.

It is certified that error appears in the above-indentified patent and that said Letters Patent is hereby corrected as shown below:

On title page, item [56]
Under OTHER PUBLICATIONS

Please change ""Flow Measurement," <u>Handbook of Fluid Dynamics</u>, V. Streeter, Editor-in-chief, published by McGraw-Hill Book Company, Inc. 1961, pp. 14-1 to 14-15" to --"Flow Measurement," <u>Handbook of Fluid Dynamics</u>, V. Streeter, Editor-in-chief, published by McGraw-Hill Book Company, Inc. 1961, pp. 14-4 to 14-15--.

Please change ""Precise Computerized In-Line "Compressibel Flow Metering," <u>Flow-Its Measurement and Control in Science and Industry</u>, Vol. 1, Part 2, Edited by R. Wendt, Jr., Published by American Institute of Physics e al., (undated) pp. 539-540." to "Precise Computerized In-Line "Compressible Flow Metering," <u>Flow-Its Measurement and Control in Science and Industry</u>, Vol. 1, Part 2, Edited by R. Wendt, Jr., Published by American Institute of Physics et al., (undated) pp. 539-540.--

Signed and Sealed this

Fourth Day of November, 1997

*Attest:*

BRUCE LEHMAN

*Attesting Officer*   Commissioner of Patents and Trademarks